United States Patent
Jungmann et al.

(10) Patent No.: US 10,024,475 B2
(45) Date of Patent: Jul. 17, 2018

(54) TAPPING FITTING

(71) Applicant: FRIATEC AKTIENGESELLSCHAFT, Mannheim (DE)

(72) Inventors: Georg Christian Jungmann, Gorxheimertal (DE); Pero Mikulic, Mannheim (DE); Alexander Rothermel, Maikammer (DE); Jean-Pierre Schatz, Mannheim (DE); Dominik Strobel, Edingen (DE)

(73) Assignee: Friatec Aktiengesellschaft, Mannheim (DE)

( * ) Notice: Subject to any disclaimer, the term of this patent is extended or adjusted under 35 U.S.C. 154(b) by 0 days.

(21) Appl. No.: 15/503,444

(22) PCT Filed: Aug. 10, 2015

(86) PCT No.: PCT/DE2015/100334
§ 371 (c)(1),
(2) Date: Feb. 13, 2017

(87) PCT Pub. No.: WO2016/023540
PCT Pub. Date: Feb. 18, 2016

(65) Prior Publication Data
US 2017/0254464 A1    Sep. 7, 2017

(30) Foreign Application Priority Data
Aug. 15, 2014   (DE) ........................ 10 2014 111 699

(51) Int. Cl.
*F16L 47/34*   (2006.01)
*F16L 41/06*   (2006.01)

(52) U.S. Cl.
CPC ........... *F16L 47/345* (2013.01); *F16L 41/065* (2013.01); *Y10T 137/612* (2015.04)

(58) Field of Classification Search
CPC ....... F16L 47/345; F16L 47/34; F16L 41/065; F16L 41/06; Y10T 137/612; Y10T 137/6123
See application file for complete search history.

(56) References Cited

U.S. PATENT DOCUMENTS 1,484,469 A * 2/1924 Brucelarie ............. F16L 45/00
                                                              138/92
3,252,475 A * 5/1966 Jones .................... F16L 41/065
                                                              137/318
(Continued)

FOREIGN PATENT DOCUMENTS

AT        000022 U2   10/1994
DE       9316819 U1    1/1994
(Continued)

OTHER PUBLICATIONS

European Patent Office, The International Search Report, dated Oct. 6, 2015, 5 pages, European Patent Office, Rijswijk, Netherlands.

*Primary Examiner* — Kevin Lee
(74) *Attorney, Agent, or Firm* — Marshall & Melhorn, LLC

(57) ABSTRACT

The invention relates to a tapping fitting, having a saddle component for positioning on and cohesively connecting to a tubular component, and having a clamping device for clamping the saddle component on the tubular component, characterized in that the clamping device has a tiltable clamping lever with a sliding profile, wherein the clamping lever is mounted via the sliding profile in a bearing shell in a first peripheral portion of the saddle component, and wherein a clamping band is attached on one side to the clamping lever at a distance from a rotation axis about which the clamping lever is tiltable in the bearing shell, and on the other side to a second peripheral portion, located opposite the first peripheral portion, of the saddle component, such (Continued)

that in the case of a tapping fitting positioned on a tubular component, when the clamping lever is tilted, the clamping band is biased and the tapping fitting is pressed against the tubular component.

15 Claims, 6 Drawing Sheets

(56) References Cited

U.S. PATENT DOCUMENTS

| | | | |
|---|---|---|---|
| 3,762,743 A * | 10/1973 | Hawle | F16L 41/06 |
| | | | 24/269 |
| 4,606,558 A | 8/1986 | Davidson | |
| 6,619,893 B2 | 9/2003 | Frick | |
| 6,902,201 B1 * | 6/2005 | Helle et al. | F16L 41/06 |
| | | | 137/317 |
| 2004/0207199 A1 | 10/2004 | Greco | |
| 2013/0334751 A1 | 12/2013 | Hogg et al. | |

FOREIGN PATENT DOCUMENTS

| | | |
|---|---|---|
| DE | 4239573 A1 | 5/1994 |
| DE | 4405798 A1 | 8/1995 |
| DE | 4420179 A1 | 12/1995 |
| DE | 4437410 A1 | 4/1996 |
| DE | 10041840 A1 | 3/2002 |
| DE | 102005057662 B4 | 4/2009 |
| DE | 102009060410 B4 | 6/2013 |
| EP | 0726419 B1 | 5/2000 |
| EP | 1469246 A1 | 10/2004 |
| EP | 2676750 A1 | 12/2013 |
| FR | 2591940 A1 | 6/1987 |

* cited by examiner

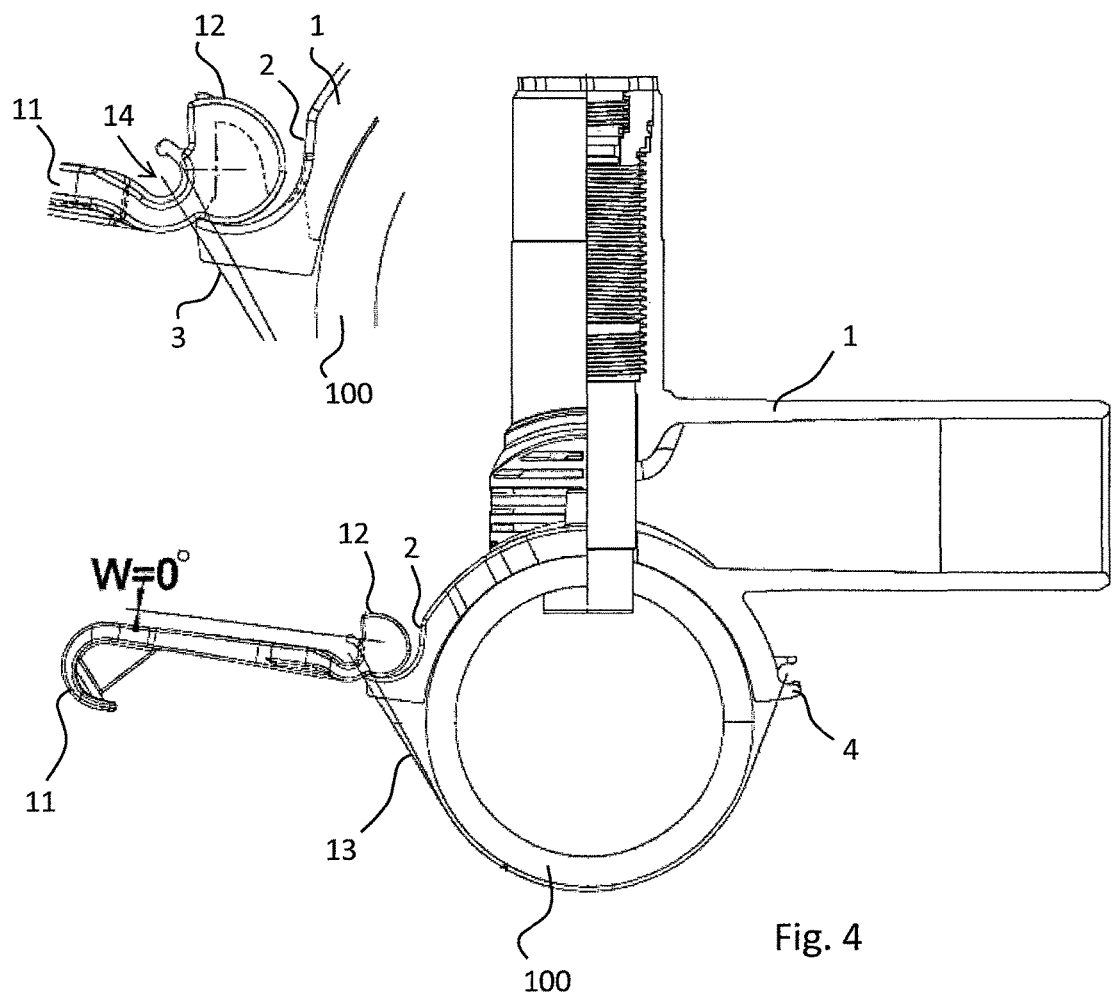

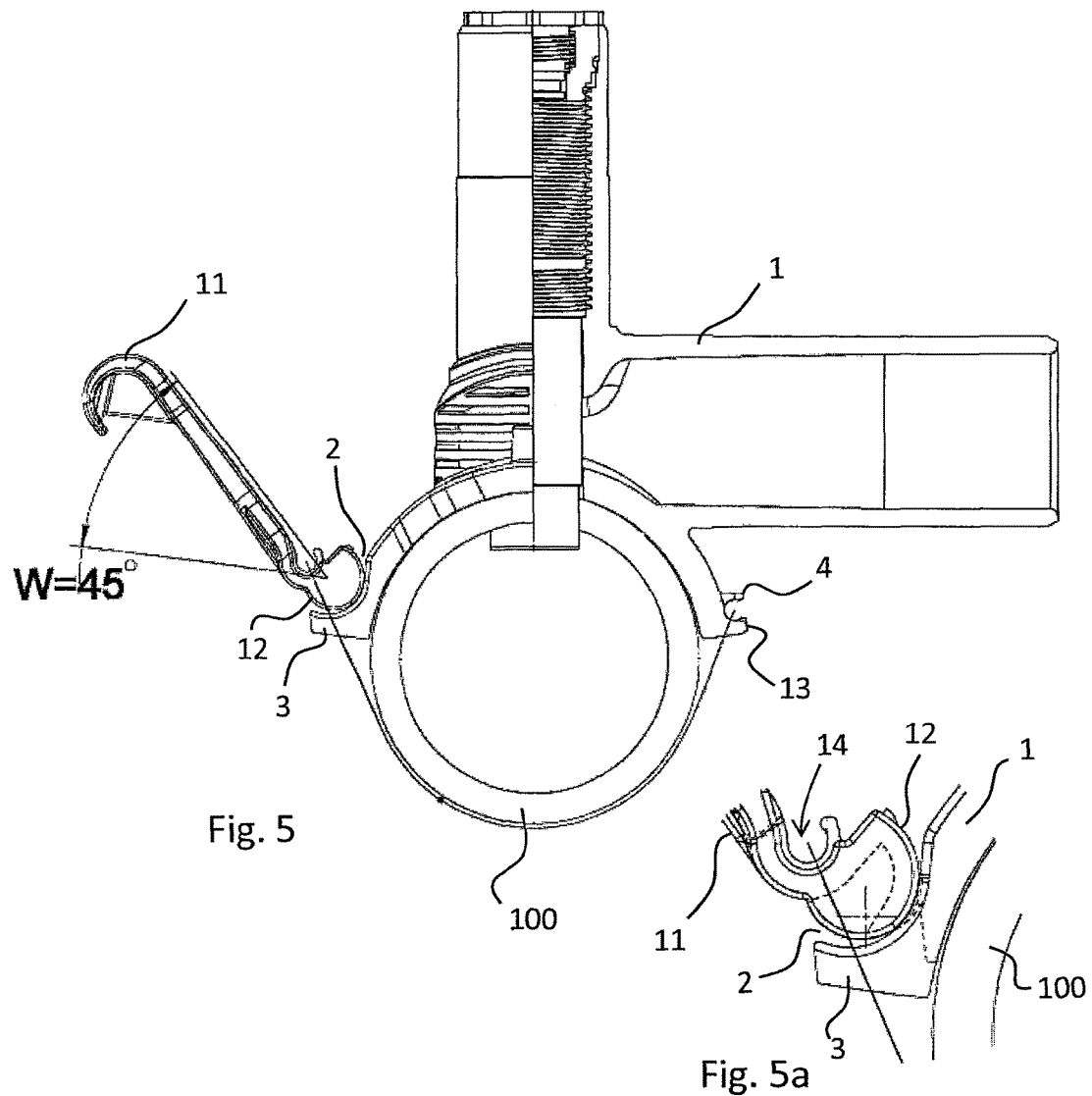

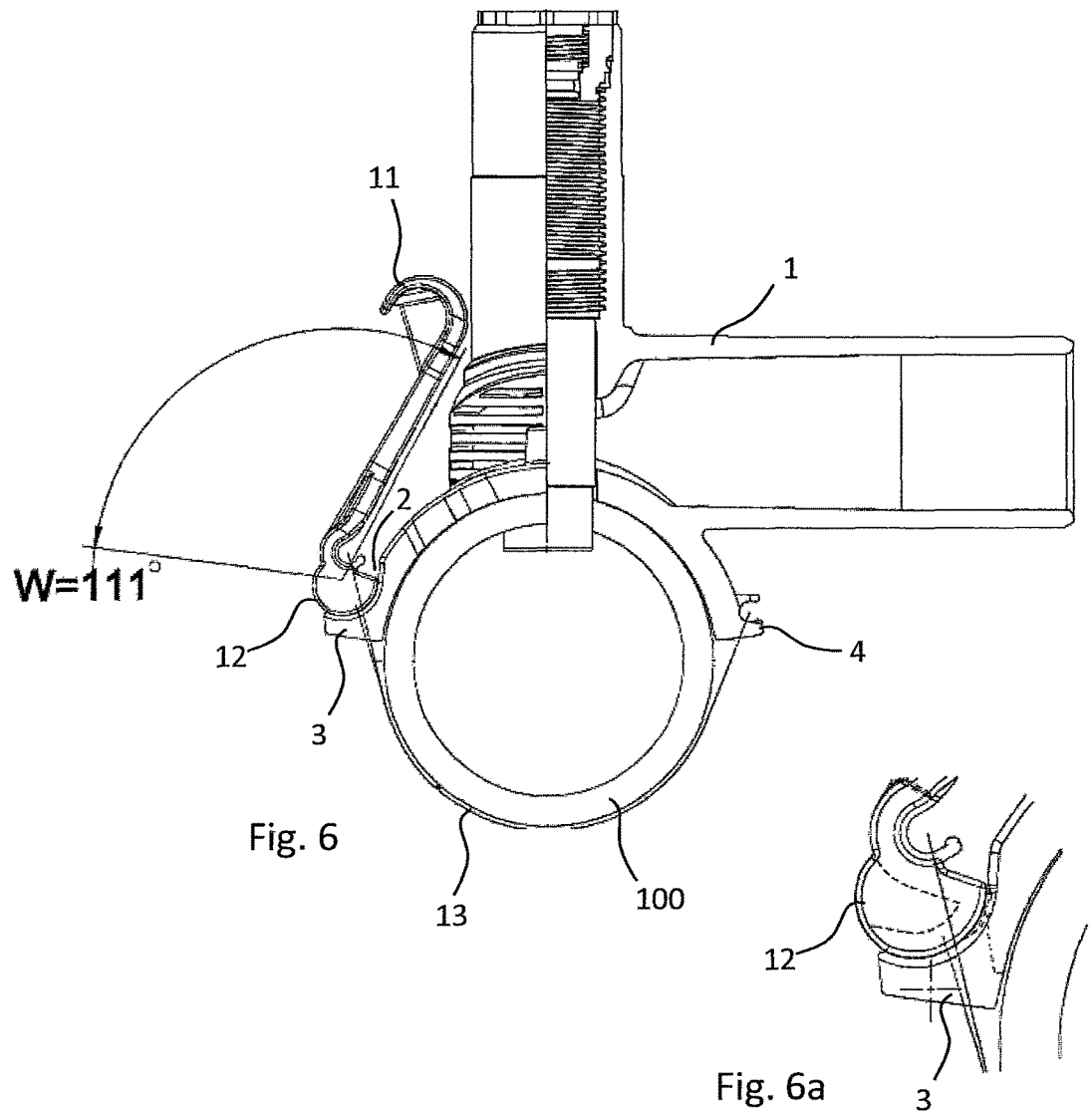

TAPPING FITTING

BACKGROUND OF THE INVENTION

The invention refers to a tapping fitting having a saddle component for positioning on and cohesively connecting to a tubular component, and having a clamping device for clamping the saddle component on the tubular component.

A tapping fitting of this kind is known from DE 10 2009 060 410 B4, for example. This fitting has a tapping sleeve, on which a tapping unit with a drill for tapping the pipe has to be set and locked in a drilling position. EP 0 726 419 B1 describes a tapping fitting made of plastic, which may be connected with the plastic pipe by welding. The tapping fitting contains a tapping sleeve, through which a drill is guided, in order to tap the pipe.

DE 10 041 840 A1 discloses a tapping device for providing an outlet on a fluid-conveying conduit, wherein the tapping device comprises a shutoff tap. DE 440 57 98 C2 refers to a tapping fitting with a sleeve, in which a valve body with a passing bore is rotatably positioned, wherein through the passing bore a drill for tapping a pipe may be guided.

EP 2 676 750 A1 describes a device for guiding pipe working apparatuses, in particular switch apparatuses, wherein the device is to be positioned on the outer circumference of the pipe to be machined, and which is provided with at least two parallel bands. The bands may be plastic bands, for example, fiber reinforced plastic bands, which have a high flexibility along their length or may have a very good elastic deformability. The bands may be attached by means of a ratchet or an alternative clamping device to the outer circumference of the conduit to be machined.

DE 42 395 73 A1 describes a tapping fitting with an integrated valve trim and lateral threaded connection as well as a clamping device. The tapping fitting may be clamped on the pipe by means of a clamping bracket, wherein the clamping bracket is attached to a side of the housing by means of a transversal pin. On an opposite side of the housing, the clamping bracket is fixedly screwed to the housing by means of a T-shaped screw and a spherical support. A tapping fitting similar to DE 42 395 73 A1 is also known from AT 000 022 U2, DE 10 2005 057 662 B4 and DE 44 201 79 A1.

DE 44 374 10 A1 describes a device for sealing a pipe leakage, in which a compress is fastened to a leak to be sealed by means of a fast clamping device. The tapping fittings known in the art have either the drawback that for fixing it to a tubular component, a tool is required, or that it is difficult to manipulate, or does not allow any sure and precise positioning of the tapping fitting on the tubular component.

SUMMARY OF THE INVENTION

The object of the invention is therefore to further develop such a tapping fitting that allows a secure and tool-less fastening of the tapping fitting on a tubular component and which is also easy to manipulate.

The object is achieved by a tapping fitting with the characteristics of claim 1. Dependent claims 2 to 12 respectively correspond to advantageous embodiments of the invention.

Therefore, the clamping device has a tiltable clamping lever with a sliding profile, wherein the clamping lever is supported over the sliding profile in a bearing shell in a first peripheral portion of the saddle component, and wherein a clamping band, on one side, is attached to the clamping lever, at a distance from a rotation axis, around which the clamping lever may be tilted in the bearing shell, and, on the other side, to a peripheral portion of the saddle component, opposite to the first peripheral portion, so that, when the tapping fitting is applied on a tubular component, by tilting the clamping lever, the clamping band is biased and the tapping fitting is pressed against the tubular component.

Due to the offset support of the suspension of the clamping band on the clamping lever, the clamping band, by tilting the clamping lever, is biased from the opened position to the closed position. The biasing of the clamping band may be further increased by the fact that the sliding profile of the clamping lever itself does exhibit an offset profile and no spherical profile.

In an embodiment, the clamping band has, on its end facing the clamping lever, a support pin or similar, which is housed in a support housing of the clamping lever. To this end, the clamping band may be formed by a plastic band, for example, which has an eyelet at its end facing the clamping lever, in which a hook-like grip element of the clamping lever inserts.

In an embodiment of the invention, the clamping lever has a groove-like recess adjacent to the sliding profile, in which an edge of the first peripheral portion is supported, when the clamping lever is in an open position. In this embodiment, it is foreseen that the tilting movement of the clamping lever from the open position to the closed position is a composite movement with two successive movement portions. In a first movement portion, the clamping lever is tilted around the edge on the first peripheral portion of the saddle component, so that the sliding profile is rotated around the edge into the bearing shell on the first peripheral portion, until the sliding profile is supported in the bearing shell. During the further rotation of the clamping lever, the second movement portion sets in, during which the clamping lever is tilted with sliding profile contacting the bearing shell, along the sliding profile. The sliding profile may be provided with an offset geometry. The sliding profile and the support housing may also be mutually adapted so that the contact surface between the sliding profile and the bearing shell increases towards the closed position with an increase of tilt, so that the friction mating between the sliding profile and the bearing shell increases correspondingly and is highest, when the closed position is reached. The change in offset of the sliding profile may decrease with an increase of the tilting angle, i.e. when gradually approaching the closed position, so that when the bias of the clamping band increases, the leverage of the clamping lever increases and therefore also when approaching the closed position, a rotation of the clamping lever is still possible by applying an acceptable force.

In an embodiment of the invention, the sliding profile of the clamping lever is therefore distanced from the bearing shell the open position, so that the sliding profile is supported in the bearing shell, i.e. contacts the bearing shell only after the tilting of the clamping lever by a determined angle around the edge from the open position towards the closed position.

The edge, the groove-like recess, the bearing shell and the sliding profile are preferably adapted to each other in a way that the clamping lever, during further rotation by an angle exceeding the determined angle, is raised from the edge, so that the clamping lever performs a tilting movement around the sliding profile in the bearing shell.

In order to fix the clamping lever in the closed position, it can be arranged in a latching position in the closed position. In this closed position representing an end position of the movement of the clamping lever it may be provided that the operator gets an acoustic feedback about reaching the end position. In a particularly preferred embodiment, the clamping lever is pressed in the closed position by means of a bias of the clamping bands into the bearing shell, so that the clamping lever, due to the friction resistance between the bearing shell and the sliding profile, is provided with a self-locking mechanism, and therefore is protected against an undesired tilting back into the open position.

The provision of the pressing pressure, with which the saddle component is fixed to the tubular component, is provided by a biasing force, which is generated by an extension of the clamping band. In a certain limited scope, the saddle component, in particular when it is made of plastic material, may accommodate an extension on both its peripheral portions, to which the clamping band is attached, therefore providing a biasing force.

In the preferred embodiment, the biasing force is provided, however, by clamping the clamping band during the tilting of the clamping lever from the open to the closed position. The clamping band may be provided, between an open and a closed position, in which the clamping band grippingly surrounds a tubular component, with an extension of up to 10% and preferably between 1% and 8%. Fundamentally, according to the diameter of the processed tubular component, another extension of the clamping band is required, in order to provide, from the theoretical point of view, an optimal pressing force of the saddle component on the tubular component. Experiments have shown, however, that for usual pipe diameters, standard clamping bands may be certainly used, which have an average extension in the range between 1% and 8%, and preferably 6%. However, practical deviations of the actual contact pressure from an ideal value are so low that during welding a high quality cohesive connection between saddle component and tubular component may be ensured.

In an embodiment of the invention, the clamping band is composed of a plastic material, which provides the extension, wherein the plastic material is preferably a polyethylene, a polypropylene, or a polyamide.

After the welding of the saddle component to the tubular component, the clamping device is normally functionless. In order to allow, in this case, a simple disassembly of the clamping device from the tapping fitting, in an embodiment of the invention, the clamping band is removably mounted on the second peripheral portion, so that after the cohesive connection of the saddle component with the tubular component, the clamping lever may be removed with the clamping band from the tapping fitting.

In order to prevent an overtightening of the clamping device and in particular of the clamping band, in an embodiment of the invention, the clamping lever, in the open position and/or in the closed position, rests against an abutment.

In order to allow an adaptation of the clamping device to the diameter of the tubular component to be processed, in an embodiment of the invention, the clamping lever is mounted in a replaceable way, so that by replacing the clamping lever with a clamping lever with a different sliding profile, according to the diameter of the tubular component, a defined clamping stroke may be provided. The sliding profiles of different clamping levers differ in particular with respect to their offset.

In order to enhance the operating comfort of the tapping fitting according to the invention and in order to reduce the number of components required, in an embodiment of the invention the clamping lever is provided in two parts, with a basis part, which is provided with the sliding profile and which is connected to the clamping band, and with a lever and gripping part, which is connected to the basis part by means of a removable connection.

BRIEF DESCRIPTION OF THE DRAWINGS

Further details of the invention are described in detail by means of following figures. In particular:

FIGS. 3-6a show a second embodiment of tapping fitting according to the invention in different angular positions of clamping lever and respective detailed view of clamping device.

DETAILED DESCRIPTION OF THE INVENTION

Figure 1:
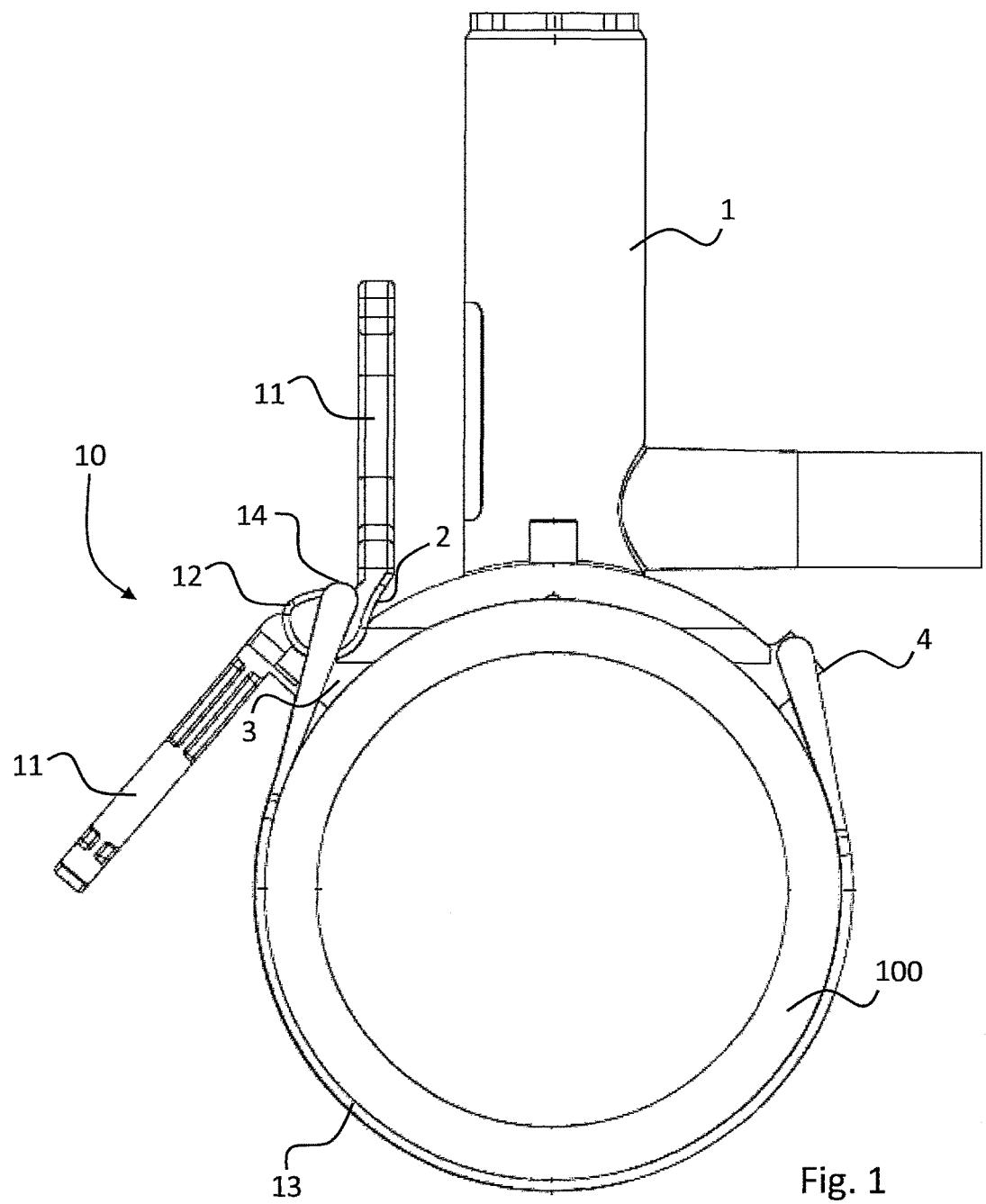
FIG. 1 shows a first embodiment of the tapping fitting according to the invention in an applied condition on a tubular component.

FIG. 1 shows a first embodiment of the tapping fitting according to the invention, which is applied on a tubular component 100. The clamping device 100 is provided with a clamping lever 11, which in FIG. 1 is shown once in the lower open position and once in the upper closed position. The clamping lever 11 has a sliding profile 12, which is supported in a bearing shell 2 in the edge area 3 of the saddle component 1. The sliding profile 12 has a non-spherical shape and an offset. Moreover, the clamping band 13 is attached to the clamping lever 11 with an offset with respect to the rotation axis of clamping lever 11. The clamping band 13 may be inserted in a support housing 14 of clamping lever 11.

The clamping band 13 therefore extends from the clamping lever 11 around a circumferential area of component 100, which is facing away from the saddle component 1, to a second peripheral portion 4 of saddle component 1, which faces the first peripheral portion 3, wherein the clamping band 13 is attached to the second edge area 4.

By tilting the clamping lever 11 from the lower open position to the upper closed position, the clamping band 13 is biased, due to offset of sliding profile 12 or support housing 14 of clamping band 13. The biasing force is provided by an extension of the clamping band 13. In the upper closed position, a frictional resistance between the sliding profile 12 and the bearing shell 2 provided a self-locking of the clamping lever 11, so that the clamping lever 11 is fixed in the upper closed position.

Figure 2:
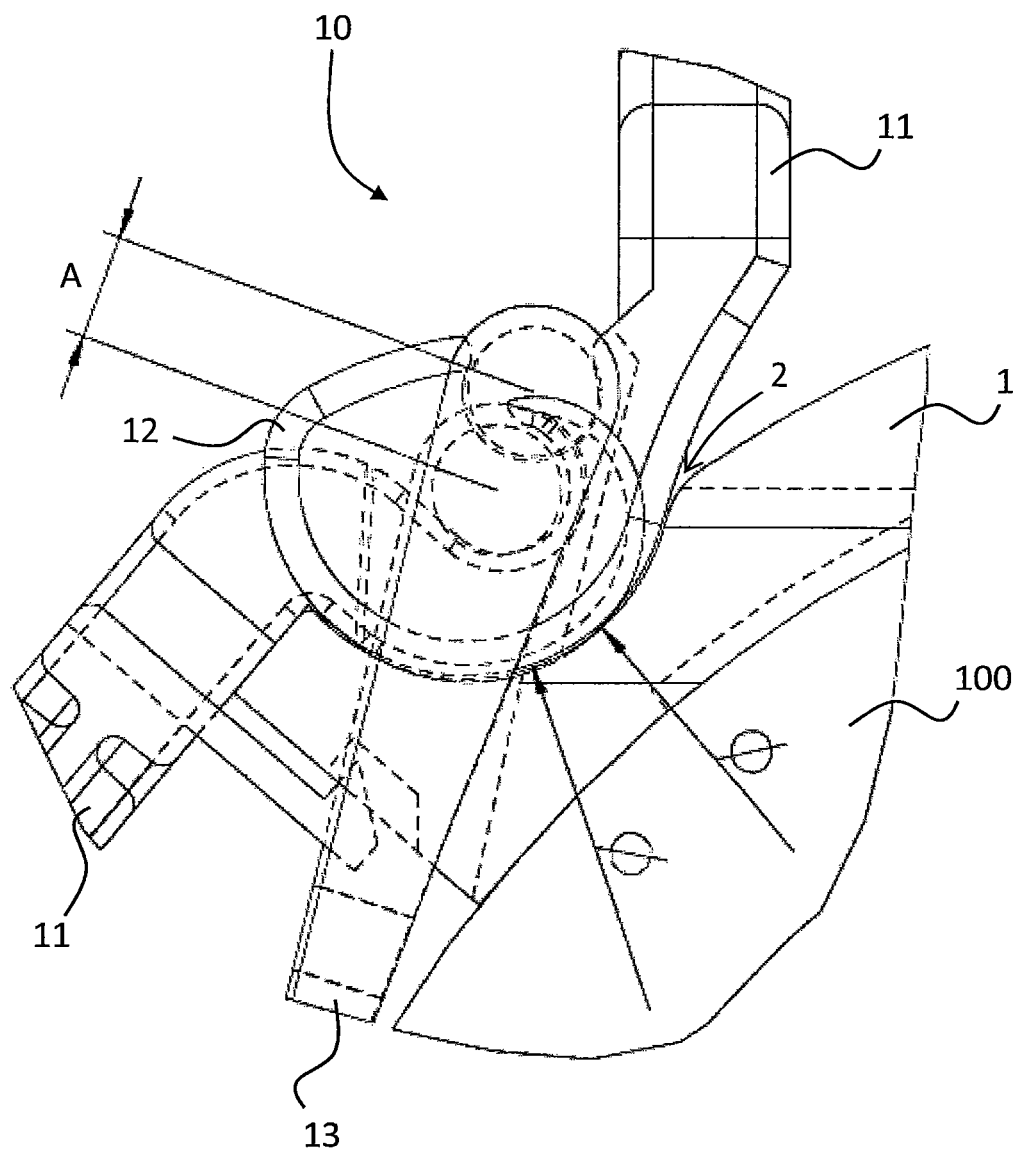
FIG. 2 shows a detailed view of clamping device of the embodiment according to FIG. 1.

FIG. 2 shows a detailed view of clamping device 10. For ease of comprehension the clamping lever 11 is again shown both in the open position (lower left) and in the closed position (upper right). Letter A indicates the clamping stroke, which is performed by the end of the clamping band 13, which is attached to the clamping lever 11, in case of rotation of clamping lever 11 from the open to the closed position. The clamping stroke is just a measure of the extension experienced by the clamping band 13. The extension is in turn proportional to the bias of the clamping band 13 and therefore to the contact pressure, with which the tubular component 100 is pressed against the saddle component 1. The clamping stroke A may therefore be adapted in a way that in the closed position of the clamping lever 11, a contact pressure required for a cohesive connection between the saddle component 1 and the tubular component 100, for example by using the heated coil welding technology, is provided. The clamping stroke A may be precisely set by setting the offset of the sliding profile 12 in the closed position of clamping lever.

Figure 3:
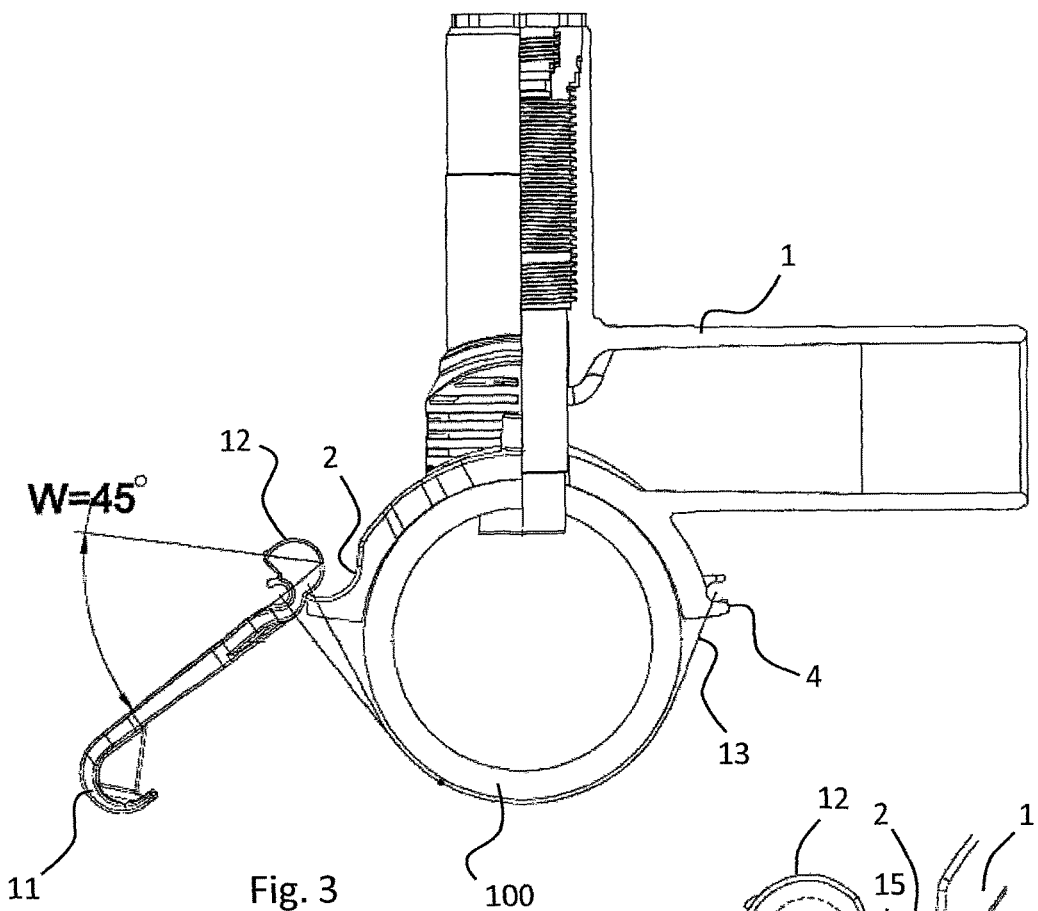
Figure 3A:
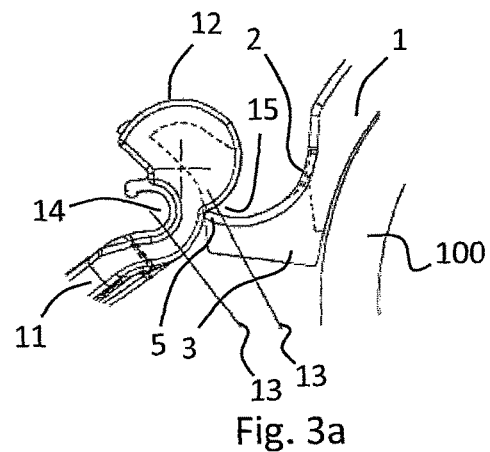

FIGS. 3 and 3*a* show a further embodiment of the tapping fitting according to the invention in the open position of clamping lever 11. In the open position, the clamping lever 11 is rotated out of the bearing shell 2 by an angle of 45°, i.e. only by tilting the clamping lever 11 by cited 45° from the open position shown in the direction of the closed position, the sliding profile 12 contacts the bearing shell 2. During the course of this tilting movement, the clamping lever 11 is connected, through the groove-like recess 15 adjacent to the sliding profile 12 with a support edge 5 on the outer edge of first peripheral portion 3 of saddle component 1. The edge 5 therefore forms just a support and tilting edge, around which the clamping lever 11 is tilted during the tilting movement by the first 45° from the open position shown towards the closed position.

The support housing 14, in which the clamping band 13 is attached to the clamping lever 11, is positioned with an offset with respect to the fulcrum formed by support edge 5 and groove-like recess 15, so that the clamping band 13 experiences a first biasing already during rotation by the first 45° from the open towards the closed position.

As shown in FIGS. 4 and 4*a*, the sliding profile 12, after the clamping lever 11 has been rotated by 45° from the open position towards the closed position, contacts the bearing shell 2 of saddle component 1 in an area adjacent to the support edge 5. The sliding profile 12, however, contacts, in the angular position of clamping lever 11 shown, the bearing shell 2 only over a relatively small portion of its length (see FIG. 4*a*).

Only by further tilting of the clamping lever from the set position of FIGS. 4 and 4*a* towards the closed position is it possible to increase the size of contact area between sliding profile 12 and bearing shell 2 (see FIGS. 5 and 5*a*), until finally reaching, in closed position shown in FIGS. 6 and 6*a*, the maximal surface contact between the sliding profile 12 and bearing shell 2. In the closed position of FIGS. 6 and 6*a*, the biasing of the clamping band 13 just generates a friction connection between the sliding profile 12 and the bearing shell 2, so that the clamping lever 11 in the closed position has a self-locking function.

The characteristics of the invention disclosed in the preceding description, in the drawings and in the claims may be relevant, individually as well as in any combination, for the execution of the invention.

LIST OF REFERENCE NUMERALS

1 saddle component
2 bearing shell
3 first peripheral portion
4 second peripheral portion
5 edge
10 clamping device
11 clamping lever
12 sliding profile
13 clamping band
14 support housing
15 groove-like recess
100 tubular component

The invention claimed is:

1. A tapping fitting, having a saddle component for positioning on and cohesively connecting to a tubular component, and having a clamping device for clamping the saddle component on the tubular component, wherein the clamping device has a tiltable clamping lever with a sliding profile, wherein the clamping lever is mounted via the sliding profile in a bearing shell in a first peripheral portion of the saddle component, and wherein a clamping band is fastened on one side to the clamping lever at a distance from a rotation axis about which the clamping lever is tiltable in the bearing shell, and on the other side to a second peripheral portion, located opposite the first peripheral portion of the saddle component, such that, when the tapping fitting is positioned on the tubular component, when the clamping lever is tilted, the clamping band is biased and the tapping fitting is pressed against the tubular component, and wherein the sliding profile has an offset geometry, and a contact surface between the sliding profile and the bearing shell increases by progressively increasing the tilting in the direction of a closed position, so that a frictional coupling between the sliding profile and the bearing shell correspondingly increases and reaches its maximum when the closed position has been reached.

2. The tapping fitting according to claim 1, wherein a support pin is provided on an end of the clamping band facing the clamping lever, which is housed within a support housing of the clamping lever.

3. The tapping fitting according to claim 1, wherein the clamping lever is provided with a recess adjacent to the sliding profile, in which an edge of the first peripheral portion is supported, when the clamping lever is in an open position.

4. The tapping fitting according to claim 3, wherein the sliding profile of clamping lever in the open position is distanced from the bearing shell, such that the sliding profile after tilting of the clamping lever is moved by a certain angle around the edge from the open position to the closed position, in the bearing shell.

5. The tapping fitting according to claim 4, wherein the edge, the recess, the bearing shell and the sliding profile are mutually adapted to each other in such a way that the clamping lever, in case of further tilting by an angle exceeding a predetermined angle, is lifted from the edge, so that the clamping lever performs a tilting movement around the sliding profile in the bearing shell.

6. The tapping fitting according to claim 1, wherein the clamping lever in a closed position is pressed in the bearing shell by a biasing of the clamping band, so that the clamping lever, due to a frictional resistance between the bearing shell and the sliding profile, is provided with a self-locking mechanism.

7. The tapping fitting according to claim 1, wherein the clamping band, between an open position and a closed position, in which the clamping band grippingly surrounds a tubular component, has an extension of up to 10%.

8. The tapping fitting according to claim 1, wherein the clamping band, between an open position and a closed position, in which the clamping band grippingly surrounds a tubular component, has an extension of between 1% and 8%.

9. The tapping fitting according to claim 1, wherein the clamping band, between an open position and a closed position, in which the clamping band grippingly surrounds a tubular component, has an extension equal to 6%.

10. The tapping fitting according to claim 7, wherein the clamping band is made of a plastic material, which provides the extension.

11. The tapping fitting according to claim 7, wherein the clamping band is made of a polyethylene, a polypropylene or a polyamide.

12. The tapping fitting according to claim 1, wherein the clamping band is removably mounted on the second peripheral portion, so that after completion of the cohesive connection of the saddle component to the tubular component, the clamping lever may be removed from the tapping fitting together with the clamping band.

13. The tapping fitting according to claim 1, wherein the clamping lever, in an open and/or in a closed position, contacts an abutment.

14. The tapping fitting according to claim 1, wherein the clamping lever is mounted in a replaceable way, so that by replacing the clamping lever with a clamping lever with a different sliding profile, according to a diameter of a tubular component, a defined clamping stroke may be provided.

15. The tapping fitting according to claim 1, wherein the clamping lever is formed in two parts, with a basis part, which has the sliding profile and which is connected to the clamping band, and with a lever and gripping part, which is connected to the basis part by means of a removable connection.

* * * * *